(12) United States Patent
Kolhatkar et al.

(10) Patent No.: US 10,008,857 B2
(45) Date of Patent: Jun. 26, 2018

(54) DFIG-BASED UPS SYSTEMS AND METHODS OF CONTROL

(71) Applicant: General Electric Company, Schenectady, NY (US)

(72) Inventors: Yashomani Y. Kolhatkar, Karnataka (IN); Silvio Colombi, Losone (CH); Arvind Kumar Tiwari, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 173 days.

(21) Appl. No.: 15/066,133

(22) Filed: Mar. 10, 2016

(65) Prior Publication Data

US 2017/0264101 A1    Sep. 14, 2017

(51) Int. Cl.

| | |
|---|---|
| H02J 3/40 | (2006.01) |
| H02P 9/00 | (2006.01) |
| H02J 9/06 | (2006.01) |
| H02J 9/08 | (2006.01) |
| H02P 9/04 | (2006.01) |
| H02P 9/08 | (2006.01) |

(52) U.S. Cl.
CPC ............... *H02J 3/40* (2013.01); *H02J 9/066* (2013.01); *H02J 9/08* (2013.01); *H02P 9/007* (2013.01); *H02P 9/04* (2013.01); *H02P 9/08* (2013.01)

(58) Field of Classification Search
CPC ...... H02J 3/40; H02J 9/066; H02J 9/08; H02J 9/04; H02P 9/08; H02P 9/007
USPC ................................. 307/80, 84, 65; 290/43
See application file for complete search history.

(56) References Cited

U.S. PATENT DOCUMENTS

| | | |
|---|---|---|
| 4,001,666 A | 1/1977 | Grenfell |
| 4,590,384 A | 5/1986 | Bronicki |
| 4,731,547 A | 3/1988 | Alenduff et al. |
| (Continued) | | |

FOREIGN PATENT DOCUMENTS

| | | |
|---|---|---|
| EP | 2 251 953 A2 | 11/2010 |
| EP | 2 778 352 A1 | 9/2014 |
| WO | 02/061910 A2 | 8/2002 |

OTHER PUBLICATIONS

Daley J.M et al., "Utilizing Emergency and Standby Power for Peak Shaving", Industry Applications, IEEE Transactions on, vol. IA-18, Issue: 1, pp. 9-15, Jan. 1982.

(Continued)

*Primary Examiner* — Dinh T Le
(74) *Attorney, Agent, or Firm* — GE Global Patent Operation; Nittin Joshi

(57) ABSTRACT

An uninterruptable power supply (UPS) system for providing power to a load coupled to a utility power source is provided. The UPS system includes a doubly-fed induction generator (DFIG), a rechargeable energy storage system, a first inverter, and a controller in communication with the DFIG and the first inverter. The DFIG includes a stator and a rotor coupled to the load. The stator and rotor are magnetically coupled together. The DFIG generates an auxiliary power output. The first inverter is coupled between the rotor and the rechargeable energy storage system. The controller detects a power disturbance associated with the utility power source and controls the first inverter to provide an excitation input to the rotor in response to the power disturbance. The DFIG provides the auxiliary power output to the load based on the excitation input.

20 Claims, 4 Drawing Sheets

(56) References Cited

U.S. PATENT DOCUMENTS

| | | | |
|---|---|---|---|
| 6,281,601 B1 | 8/2001 | Edelman et al. | |
| 6,877,578 B2 * | 4/2005 | Krzesicki | B60K 6/44 |
| | | | 180/243 |
| 7,372,177 B2 | 5/2008 | Colombi et al. | |
| 7,423,412 B2 * | 9/2008 | Weng | H02P 9/007 |
| | | | 290/40 R |
| 8,215,896 B2 | 7/2012 | Kooijman et al. | |
| 8,519,568 B2 * | 8/2013 | Langel | H02J 3/386 |
| | | | 307/85 |
| 8,664,788 B1 * | 3/2014 | Wagoner | F03D 7/0244 |
| | | | 290/44 |
| 2009/0212564 A1 * | 8/2009 | Yang | H02P 9/009 |
| | | | 290/44 |
| 2012/0205981 A1 | 8/2012 | Varma et al. | |
| 2013/0193760 A1 | 8/2013 | Colombi et al. | |
| 2014/0266054 A1 | 9/2014 | Faries et al. | |
| 2015/0108761 A1 | 4/2015 | Bala et al. | |

OTHER PUBLICATIONS

Baalbergen J.F et al., "Power management strategies for generator-set with energy storage for 4Q-load", Power Electronics Specialists Conference, 2008. PESC 2008. IEEE, pp. 3901-3906, Jun. 15-19, 2008, Rhodes.

International Search Report and Written Opinion issued in connection with corresponding PCT Application No. PCT/US2017/021721 dated May 24, 2017.

\* cited by examiner

DFIG-BASED UPS SYSTEMS AND METHODS OF CONTROL

BACKGROUND

The field relates generally to doubly-fed induction generator (DFIG)-based uninterruptible power supply systems, and more specifically, to offline DFIG-based uninterruptible power supply systems with controllable power outputs.

Robust power systems enable supplying power to one or more loads. Such power systems may include combinations of generation, transport, rectification, inversion and conversion of power to supply energy for electronic, optical, mechanical, and/or nuclear applications and loads. When implementing power systems and architectures, practical considerations include cost, size, reliability, and ease of implementation.

In at least some known power systems, one or more uninterruptible power supplies (UPSs) facilitate supplying power to a load. UPSs facilitate ensuring that power is continuously supplied to one or more critical loads, even when one or more components of a power system fail. Accordingly, UPSs provide a redundant power source. UPSs may be utilized in a number of applications (e.g., utility substations, industrial plants, marine systems, high security systems, hospitals, datacomm and telecomm centers, semiconductor manufacturing sites, nuclear power plants, etc.). Further, UPSs may be utilized in high, medium, or low power applications. For example, UPSs may be used in relatively small power systems (e.g., entertainment or consumer systems) or microsystems (e.g., a chip-based system).

At least some known UPSs include a transformer coupled between a load and a medium voltage inverter. The inverter converts power received from a direct current (DC) power source into an alternating current (AC) power signal that is transferred to the load via the transformer. Although the inverter may be controllable to provide the load with variable voltage from the DC power source, the inverter may not have the capabilities to provide the required power quality to the load in the event of a power disturbance.

BRIEF DESCRIPTION

In one aspect, an uninterruptable power supply (UPS) system for providing power to a load coupled to a utility power source is provided. The UPS system includes a doubly-fed induction generator (DFIG), a rechargeable energy storage system, a first inverter, and a controller in communication with the DFIG and the first inverter. The DFIG includes a stator and a rotor coupled to the load. The stator and rotor are magnetically coupled together. The DFIG generates an auxiliary power output. The first inverter is coupled between the rotor and the rechargeable energy storage system. The controller detects a power disturbance associated with the utility power source and controls the first inverter to provide an excitation input to the rotor in response to the power disturbance. The DFIG provides the auxiliary power output to the load based on the excitation input.

In another aspect, a controller for a UPS system coupled to a load is provided. The controller includes a processor and a memory in communication with said processer. The controller is in communication with a DFIG and an inverter. The DFIG includes a rotor and a stator coupled to the load. The DFIG generates an auxiliary power output. The inverter is coupled between the rotor and a rechargeable energy storage system. The processor detects a power disturbance associated with a utility power source coupled to the load and controls the inverter to provide an excitation input to the rotor in response to the power disturbance. The DFIG provides the auxiliary power output to the load based on the excitation input In yet another aspect, a method for providing power to a load coupled to a utility power source with a UPS system is provided. The UPS system includes a DFIG, an inverter, a rechargeable energy storage system coupled to the inverter, and a controller in communication with the DFIG and the inverter. The DFIG includes a stator coupled to the load and a rotor coupled to the inverter. The method is implemented by a controller. The method includes detecting a power disturbance associated with the utility power source and controlling the inverter to provide an excitation input to the rotor in response to the power disturbance. The DFIG generates an auxiliary power output to the load based on the excitation input.

DRAWINGS

These and other features, aspects, and advantages of the present disclosure will become better understood when the following detailed description is read with reference to the accompanying drawings in which like characters represent like parts throughout the drawings, wherein.

Figure 1:
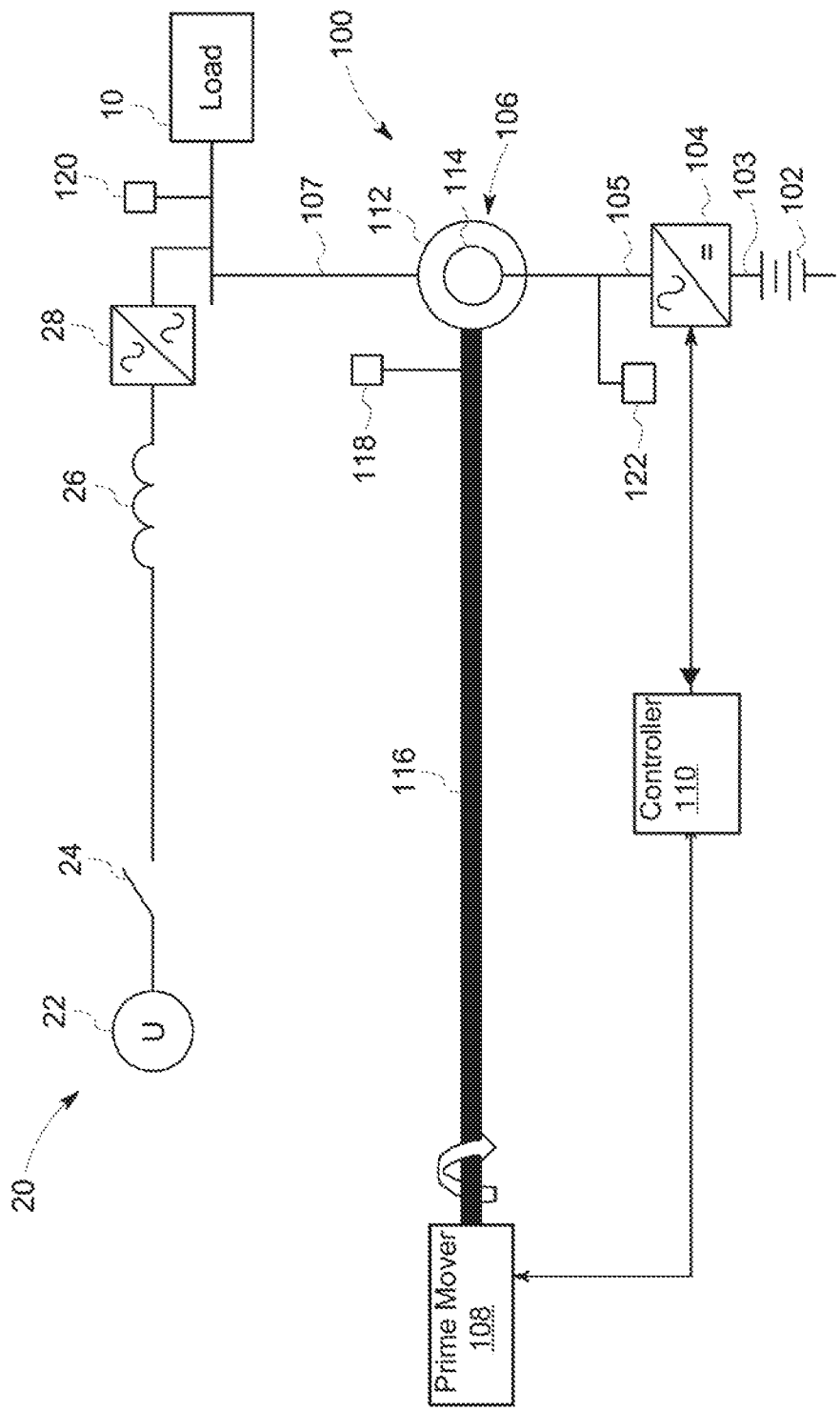
FIG. 1 is a schematic view of an exemplary power system including an uninterruptable power supply (UPS) system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The systems and methods described herein facilitate uninterrupted, controllable power at critical loads within a power system. Specifically, the systems and methods described herein facilitate providing auxiliary power to a load during periods that include a utility power source experiencing a power disturbance, such as a blackout, brownout, or power of an insufficient quality. The systems and methods described herein include an uninterruptible power supply (UPS) system with a rechargeable energy storage system, a low voltage inverter, a doubly-fed induction generator (DFIG) coupled to the load, a prime mover, and a controller. The controller operates the inverter and the prime mover to control the UPS system. When the controller detects a power disturbance, the controller causes the inverter to generate an excitation input and provide the excitation input to a rotor of the DFIG. The rotor is attached to a rotatable shaft coupled to the prime mover. The controller activates the prime mover to cause the shaft and rotor to be rotated. Rotating the rotor and providing the excitation input causes the DFIG to generate an auxiliary power output at a stator of the DFIG. The auxiliary power output is transmitted to the load from the stator. The quality, frequency, phase, and magnitude of the auxiliary power output is controlled by adjusting the excitation input and a rotor speed of the prime mover to provide enhanced control over the UPS system.

FIG. 1 is a schematic view of an exemplary power system, and more specifically, an uninterruptable power supply (UPS) system 100. UPS system 100 is coupled to a load 10. In the exemplary embodiment, load 10 is coupled to a utility power system 20 associated with a utility service provider to receive electrical power. Utility power system 20 includes a utility power source 22, a switch 24, an inductor 26, and a static bypass 28 serially coupled to each other. Utility power source 22 generates a utility power output for one or more loads (including load 10). In the exemplary embodiment, the utility power output is a three-phase alternating current (AC) power output. For example, the utility power output is a three-phase, 60 hertz (Hz), 208 volts root-means-squared (Vrms) phase-to-phase voltage. In another example, the utility power output is a three-phase, 50 Hz, 400 Vrms phase-to-phase voltage. Alternatively, the utility power output may include a different number of phases, frequency, and/or peak voltage.

When utility power source 22 experiences a power disturbance, static bypass 28 is configured to electrically disconnect load 10 from utility power source 22. The power disturbance may include, but is not limited to, power failure, brown outs, excessive voltage, excessive current, and reduced power quality (i.e., a power factor of the power is decreased).

UPS system 100 is configured to supply an auxiliary power output to load 10 in response to a power disturbance. In addition, in the exemplary embodiment, when utility power system 20 is operating normally (i.e., providing power to load 10), UPS system 100 is configured to provide the auxiliary power output to load 10 to maintain a continuous, predetermined quality of power. The auxiliary power output has a number of phases and frequency (e.g., three phases and 60 Hz) that match the number of phases and the frequency of the power output from utility power system 20. As described herein, in some embodiments, UPS system 100 is configured to transfer a portion of the auxiliary power output to utility power system 20 for supplying power to other loads coupled to utility power system 20. In some embodiments, the portion of the auxiliary power output may be sold to the utility service provider or another party associated with a different load.

In the exemplary embodiment, UPS system 100 includes rechargeable energy storage system 102, an inverter 104, a doubly-fed induction generator (DFIG) 106, a prime mover 108, and a controller 110. In other embodiments, UPS system 100 may include additional, fewer, or alternative components, including those described elsewhere herein.

Rechargeable energy storage system 102 is configured to generate and/or store electrical power. Rechargeable energy storage system 102 is a direct-current (DC) power supply. Rechargeable energy storage system 102 is further configured to receive power from UPS system 100 that is stored or used to generate additional power. In certain embodiments, rechargeable energy storage system 102 may receive power from an external source, such as a generator. In the exemplary embodiment, rechargeable energy storage system 102 is a battery bank including one or more batteries (not shown). In other embodiments, rechargeable energy storage system 102 is a capacitor Inverter 104 is coupled between rechargeable energy storage system 102 and DFIG 106. More specifically, inverter 104 is coupled to rechargeable energy storage system 102 via an inverter bus 103 and is coupled to DFIG 106 via a rotor bus 105. Inverter 104 is configured to convert and transfer power to and from (i.e., bi-directionally) rechargeable energy storage system 102 and DFIG 106. In the exemplary embodiment, inverter 104 is a low voltage inverter, i.e., 1-1000 volts (V). In other embodiments, inverter 104 is a medium (1.1 kV-100 kV) or high voltage inverter (greater than 100 kV).

In one embodiment, DFIG 106 is a wound rotor, synchronous, 60 Hz, three-phase, doubly-fed induction generator (DFIG) that includes a generator stator 112 magnetically coupled to a generator rotor 114. Alternatively, DFIG 106 is any generator of any number of phases and frequency that facilitate operation of UPS system 100 as described herein. DFIG 106 is coupled to load 10 via a stator bus 107. In the exemplary embodiment, stator 112 is electrically coupled to stator bus 107 and rotor 114 is electrically coupled to rotor bus 105.

Generator rotor 114 is coupled to a rotatable shaft 116 such that rotor 114 is configured to rotate with shaft 116. In the exemplary embodiment, prime mover 108 is coupled to shaft 116. Prime mover 108 includes, for example, and without limitation, a diesel generator, a motor, or another component configured to generate a mechanical rotational torque that drives shaft 116. Shaft 116 drives rotor 114. A rotating magnetic field is induced within rotor 114 and a voltage is induced within stator 112 that is magnetically coupled to rotor 114. DFIG 106 converts the rotational mechanical energy to a sinusoidal, three-phase AC electrical energy signal (referred to herein as an "auxiliary power output") in stator 112. In the exemplary embodiment, prime mover 108 is configured to selectively vary a drive speed to adjust the rotation speed of shaft 116.

Controller 110 is communicatively coupled to inverter 104 and prime mover 108 to control UPS system 100. In particular, controller 110 is configured to selectively control a frequency, phase, and magnitude of power generated by inverter 104 (i.e., the excitation input) and the drive or rotor speed of prime mover 108. In addition, controller 110 is configured to activate and deactivate inverter 104 and prime mover 108. In at least some embodiments, controller 110 is in electronic data communication with one or more sensors configured to monitor the power system to receive sensor data and control UPS system 100 based on the sensor data. For example, controller 110 is communicatively coupled to a rotor tachometer 118 configured to monitor shaft 116 to calculate a rotation speed of shaft 116 or rotor 114. In another example, controller 110 is communicatively coupled to a load electrical sensor 120 electrically coupled to load 10 and an inverter electrical sensor 122 electrically coupled to inverter 104 to monitor a current, voltage, power, power factor, and/or other electrical values at load 10 and inverter 104, respectively. In other embodiments, controller 110 may be communicatively coupled to different types, numbers, and/or positions of sensors within the power system.

In the exemplary embodiment, when utility power source 22 is functioning properly, the utility power is transferred to load 10 and stator 112. In at least some embodiments, inverter 104 and prime mover 108 are turned off. Energizing stator 112 with the utility power generates electrical power at rotor 114 and inverter 104. Since inverter 104 is deactivated, the generated power is not converted and transmitted to energy storage system 102. However, the generated power keeps inverter 104 and DFIG 106 "hot", or ready to activate and react to power disturbances within a reduced period of time.

When controller 110 detects a power disturbance associated with utility power system 20, controller 110 is configured to activate inverter 104 to operate UPS system 100 in a first operational mode. In the first operational mode, power from rechargeable energy storage system 102 is received and converted by inverter 104 into an excitation input. The excitation input is transmitted to rotor 114. In the first operational mode, prime mover 108 has not been activated to rotate shaft 116. Accordingly, rotor 114 and stator 112 of DFIG 106 operate as a transformer to generate an auxiliary power output for load 10. More specifically, the excitation input provided to rotor 114 by inverter 104 causes a rotating magnetic field to be induced into stator 112 to generate the auxiliary power output. Since stator 112 is already energized, the auxiliary power output may be generated in a reduced period of time (e.g., 2 milliseconds). The auxiliary power output is provided to load 10 to facilitate uninterrupted power supplied to load 10. Controller 110 may be configured to monitor the auxiliary power output at load 10 and adjust one or more control variables of inverter 104 (e.g., such as frequency) to maintain a frequency and phase of auxiliary power output similar to the frequency and phase of the utility power output. Load 10 is configured or rated to operate using power with a predetermined frequency and phase. For example, load 10 may be configured to operate using three phase, 60 Hz power. Therefore, UPS system 100 maintains a substantially similar frequency and phase to facilitate operation of load 10.

While in the first operational mode, controller 110 activates prime mover 108 to operate UPS system 100 in a second operational mode. Controller 110 transmits a control signal to prime mover 108 to drive shaft 116 at an increasing rotor speed to rotate rotor 114 up to a predetermined speed. The movement of rotor 114 increases the magnetic field induced by the excitation input and the generated auxiliary power output. As the rotor speed is increased, controller 110 is configured to control inverter 104 to compensate or adjust a magnitude, frequency, and/or phase of the excitation input to adjust the induced magnetic field and to maintain the auxiliary power output at substantially the same frequency and phase as the utility power output.

Controller 110 is configured to monitor UPS system 100 and load 10 and adjust the excitation input of inverter 104 and the rotor speed of prime mover 108 to operate DFIG 106 in a synchronous mode, a subsynchronous mode, or a supersynchronous mode. In the synchronous mode, the rotor speed is synchronized with or proportional to the auxiliary power output. In subsynchronous and supersynchronous modes, the rotor speed is not synchronized with the auxiliary power output. Instead, the excitation input is adjusted to compensate for the rotor speed.

For those circumstances when rotor 114 is being turned at a synchronous speed, controller 110 excites generator rotor 114 with real power transmitted from inverter 104 through rotor bus 105. Generator stator 112 generates the auxiliary power output at the synchronous frequency that is transmitted to load 10 as described above.

For those circumstances when generator rotor 114 is being turned at a speed slower than synchronous speed as defined by generator stator 112, i.e., a subsynchronous speed, controller 110 excites generator rotor 114 with reactive power transmitted from inverter 104 through rotor bus 105. Rotor 114 will then appear to be turning at a synchronous speed with respect to generator stator 112 and stator 112 will generate the desired, i.e., synchronous frequency, auxiliary power output that is transmitted to load 10 as described above.

For those circumstances when generator rotor 114 is being turned at a speed faster than the synchronous speed, i.e., a supersynchronous speed, controller 110 excites rotor 114 with reactive power transmitted from inverter 104 through rotor bus 105 while at the same time extracting real or active power from generator rotor 114 through rotor bus 105. Rotor 114 will then appear to be turning at a synchronous speed with respect to generator stator 112 and stator 112 will generate the auxiliary power output at the synchronous frequency that is transmitted to load 10 as described above. Inverter 104 converts the real power extracted from rotor 114 into DC power to recharge energy storage system 102. In at least some embodiments, controller 110 is configured to switch between the modes to optimize fuel usage of prime mover 108 or another operating characteristic of UPS system 100.

In at least some embodiments, UPS system 100 is configured to provide the auxiliary power output even when no power disturbances associated with utility power system 20 are detected. UPS system 100 facilitates enhanced control of power output and quality using two separate control variables (i.e., rotor speed and the excitation power output). Therefore, UPS system 100 provides at least a portion of power to load 10 to reduce the power supplied by utility power source 22 to load 10. In certain embodiments, UPS system 100 includes a phase-locked loop (PLL) control system (not shown) coupled to utility power system 20 to synchronize the utility power output and the auxiliary power output of UPS system 100.

In certain embodiments, UPS system 100 is configured to provide a portion of the auxiliary power output to utility power system 20 to be distributed to other loads. The portion of the auxiliary power output may be purchased by a utility provider associated with utility power system 20. In particular, the portion may be purchased during periods with high power demands and increased power costs for the utility provider. Controller 110 may be configured to monitor utility power system 20 to determine whether or not to transmit the portion of the auxiliary power output. For example, if controller 110 determines the power cost is above a predefined threshold value, controller 110 transfers the portion of power to utility power system 20. Controller 110 is communicatively coupled to one or more computing devices (not shown) associated with utility power system 20 to sell and/or transfer power. In some embodiments, controller 110 is communicatively coupled to a computing device associated with an operator or owner of load 10 or UPS system 100 to receive user input for selling and transferring power.

To transfer the portion of the auxiliary power output to utility power system 20, controller 110 controls inverter 104 and prime mover 108 to vary a phase of a voltage generated by DFIG 106. In particular, controller 110 monitors electrical data with the power system and calculates the portion of the auxiliary power output $P_{DFIG}$ to transfer to utility power system 20 using Equation 1 below. Equation 1 includes the power received at load 10 $P_{Load}$, the voltage generated by DFIG 106 $V_{DFIG}$, a voltage generated by utility power source 22 $V_{Util}$, an inductance X of inductor 26, and a phase δ of the voltage $V_{DFIG}$. Equation 1 is expressed as:

$$P_{DFIG} = P_{Load} + \frac{V_{DFIG} \cdot V_{Util}}{X} \sin\delta \quad (1)$$

By varying the phase δ, controller 110 selectively controls a magnitude of power supplied to utility power system 20. In the exemplary embodiment, controller 110 calculates a projected or desired phase for the amount of power adjusts the phase δ to match the projected phase. The projected phase leads the voltage of the utility power system 20 to provide power to utility power system 20. To stop providing power to utility power system 20, controller 110 adjusts the phase δ to substantially zero such that the auxiliary power output $P_{DFIG}$ is equal to the power $P_{Load}$.

Figure 2:
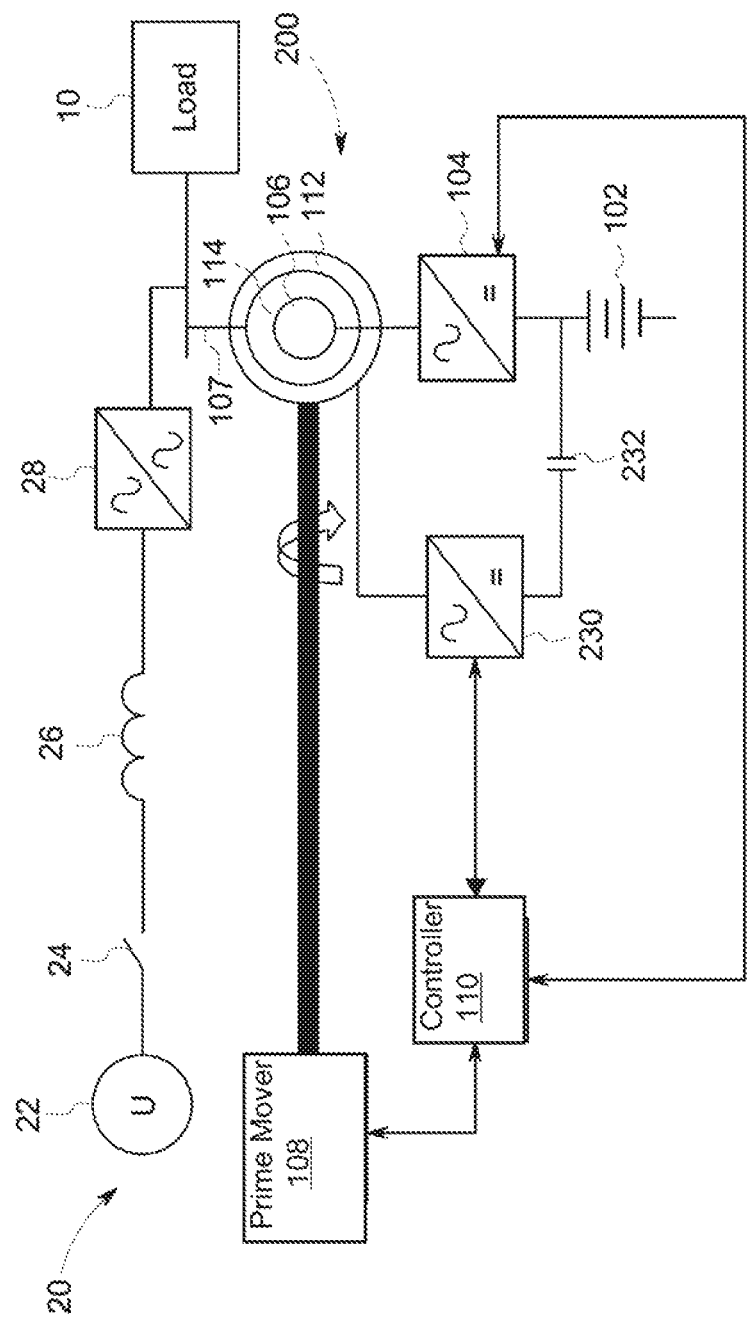
FIG. 2 is a schematic view of an alternative exemplary power system with another UPS system similar to the UPS system shown in FIG. 1.

FIG. 2 is a schematic view of an alternative exemplary UPS system 200 coupled to load 10 and utility power system 20. UPS system 200 is similar to UPS system 100 shown in FIG. 1 and, in absence of contrary representation, includes similar reference numbers. Unlike UPS system 100, UPS system 200 includes a secondary inverter 230 and a capacitor 232 coupled between rechargeable energy storage system 102 and stator 112. In the exemplary embodiment, inverter 230 is a low voltage inverter. Inverter 230 is coupled to a different winding of stator 112 from the winding coupled to stator bus 107 and load 10. In other embodiments, inverter 230 may be coupled to the same winding as stator bus 107. In such embodiments, inverter 230 is a medium voltage inverter configured to receive power from utility power source 22.

Inverter 230 is communicatively coupled to controller 110 to enable controller 110 to operate inverter 230. Inverter 230 is configured to charge rechargeable energy storage system 102 during operation of UPS system 100. Inverter 230 receives AC power from stator 112, converts the AC power to DC power, and transfers the DC power to capacitor 232 to be stored. In some embodiments in which inverter 230 is coupled to stator bus 107, inverter 230 receives medium voltage AC power from utility power source 22 and coverts the AC power to DC power to charge capacitor 232. The DC power may be low or medium voltage. DFIG 106 acts as a medium voltage transformer between inverters 104, 230 to form a loop between inverters 104, 230, capacitor 232, and DFIG 106. When the voltage of capacitor 232 varies (e.g., inverters 104, 230 are deactivated), the stored power at capacitor 232 is discharged to rechargeable energy storage system 102. Inverter 230 and capacitor 232 enable rechargeable energy storage system 102 to be charged without operating prime mover in supersynchronous mode to conserve fuel (or another power source of prime mover 108).

Figure 3:
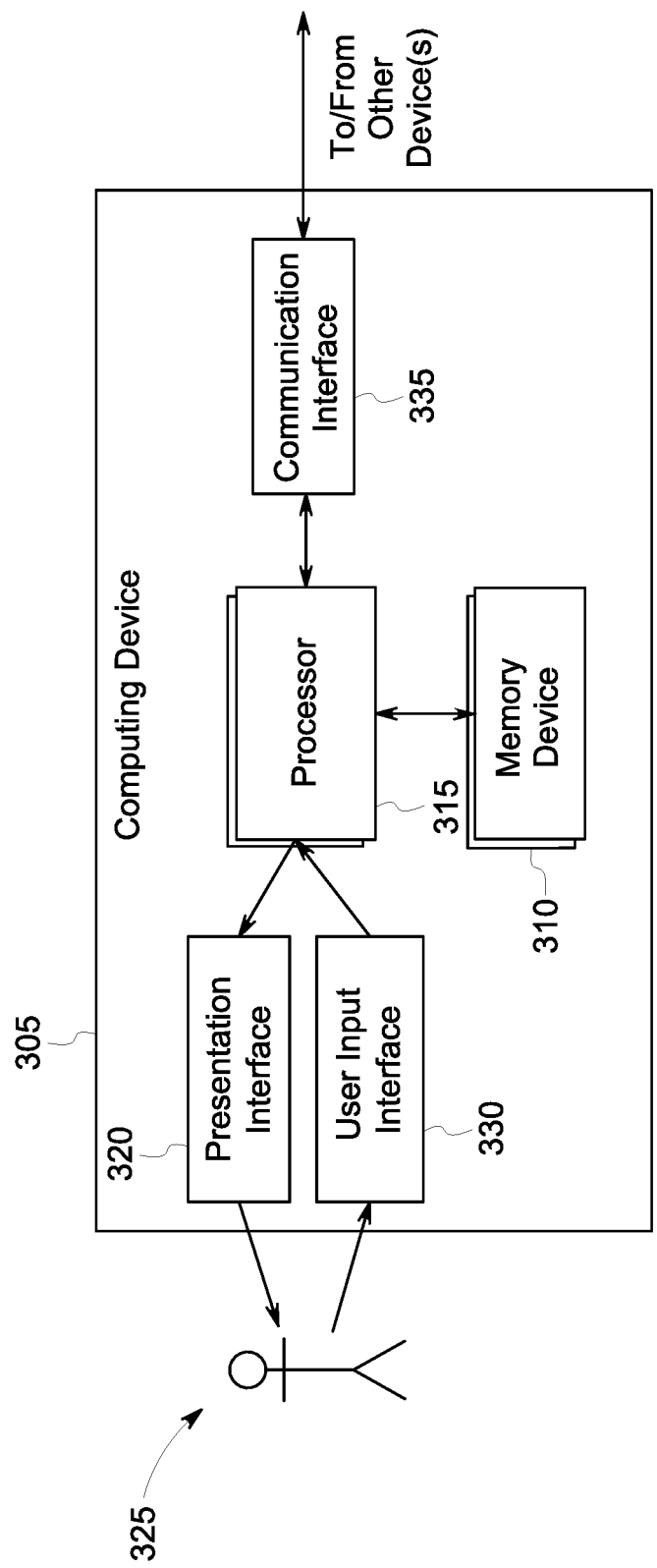
FIG. 3 is a block diagram of an exemplary computing device that may be used in the UPS system shown in FIG. 1.

FIG. 3 is a block diagram of an exemplary computing device 305 that may be used to monitor and/or control the operation of a UPS system such as UPS systems 100, 200 (shown in FIGS. 1 and 2). In the exemplary embodiment, controller 110 (shown in FIG. 1) is implemented using computing device 305. Computing device 305 includes a memory device 310 and a processor 315 operatively coupled to memory device 310 for executing instructions.

In some embodiments, processor 315 includes one or more processing units (e.g., in a multi-core configuration). In certain embodiments, executable instructions are stored in memory device 310. Computing device 305 is configurable to perform one or more operations described herein by programming processor 315. For example, processor 315 may be programmed by encoding an operation as one or more executable instructions and providing the executable instructions in memory device 310.

In addition, in the exemplary embodiment, memory device 310 is at least one device coupled to processor 315 that enables storage and retrieval of information such as computer-executable instructions and data, including, without limitation, operating data, parameters, setpoints, threshold values, and/or any other data that enables computing device 305 to function as described herein. Memory device 310 may include one or more tangible, non-transitory, computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Memory device 310 may be configured to store operational measurements including, without limitation, utility electric power grid voltage and current readings (not shown in FIG. 1), localized voltage and current readings throughout an electric power system including a UPS system (e.g., UPS system 100), and/or any other type of data. In some embodiments, processor 315 removes or "purges" data from memory device 310 based on the age of the data. For example, processor 315 may overwrite previously recorded and stored data associated with a subsequent time and/or event. In addition, or alternatively, processor 315 may remove data that exceeds a predetermined time interval. Also, memory device 310 includes, without limitation, sufficient data, algorithms, and commands to facilitate centralized and distributed control of electric power system protection and control systems (discussed further below).

In some embodiments, computing device 305 includes a presentation interface 320 coupled to processor 315. Presentation interface 320 presents information, such as a user interface and/or an alarm, to a user 325. In one embodiment, presentation interface 320 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 320 includes one or more display devices. In addition, or alternatively, presentation interface 320 includes an audio output device (not shown) (e.g., an audio adapter and/or a speaker) and/or a printer (not shown). In some embodiments, presentation interface 320 presents an alarm associated with a synchronous machine (not shown in FIG. 1), such as by using a human machine interface (HMI) (not shown).

In some embodiments, computing device 305 includes a user input interface 330. In the exemplary embodiment, user input interface 330 is coupled to processor 315 and receives input from user 325. User input interface 330 may include, for example, a keyboard, a pointing device, a mouse, a stylus, a touch sensitive panel (e.g., a touch pad or a touch screen), and/or an audio input interface (e.g., including a microphone). A single component, such as a touch screen, may function as both a display device of presentation interface 320 and user input interface 330.

A communication interface 335 is coupled to processor 315 and is configured to be coupled in communication with one or more other devices, such as inverter 104, prime mover 108 (both shown in FIG. 1), a sensor or another computing device 305, and to perform input and output operations with respect to such devices. For example, communication interface 335 may include, without limitation, a wired network adapter, a wireless network adapter, a mobile telecommunications adapter, a serial communication adapter, and/or a parallel communication adapter. Communication interface 335 may receive data from and/or transmit data to one or more remote devices. For example, a communication interface 335 of one computing device 305 may transmit an alarm to the communication interface 335 of another computing device 305.

Presentation interface 320 and/or communication interface 335 are both capable of providing information suitable for use with the methods described herein (e.g., to user 325 or another device). Accordingly, presentation interface 320 and communication interface 335 may be referred to as output devices. Similarly, user input interface 330 and communication interface 335 are capable of receiving information suitable for use with the methods described herein and may be referred to as input devices.

Figure 4:
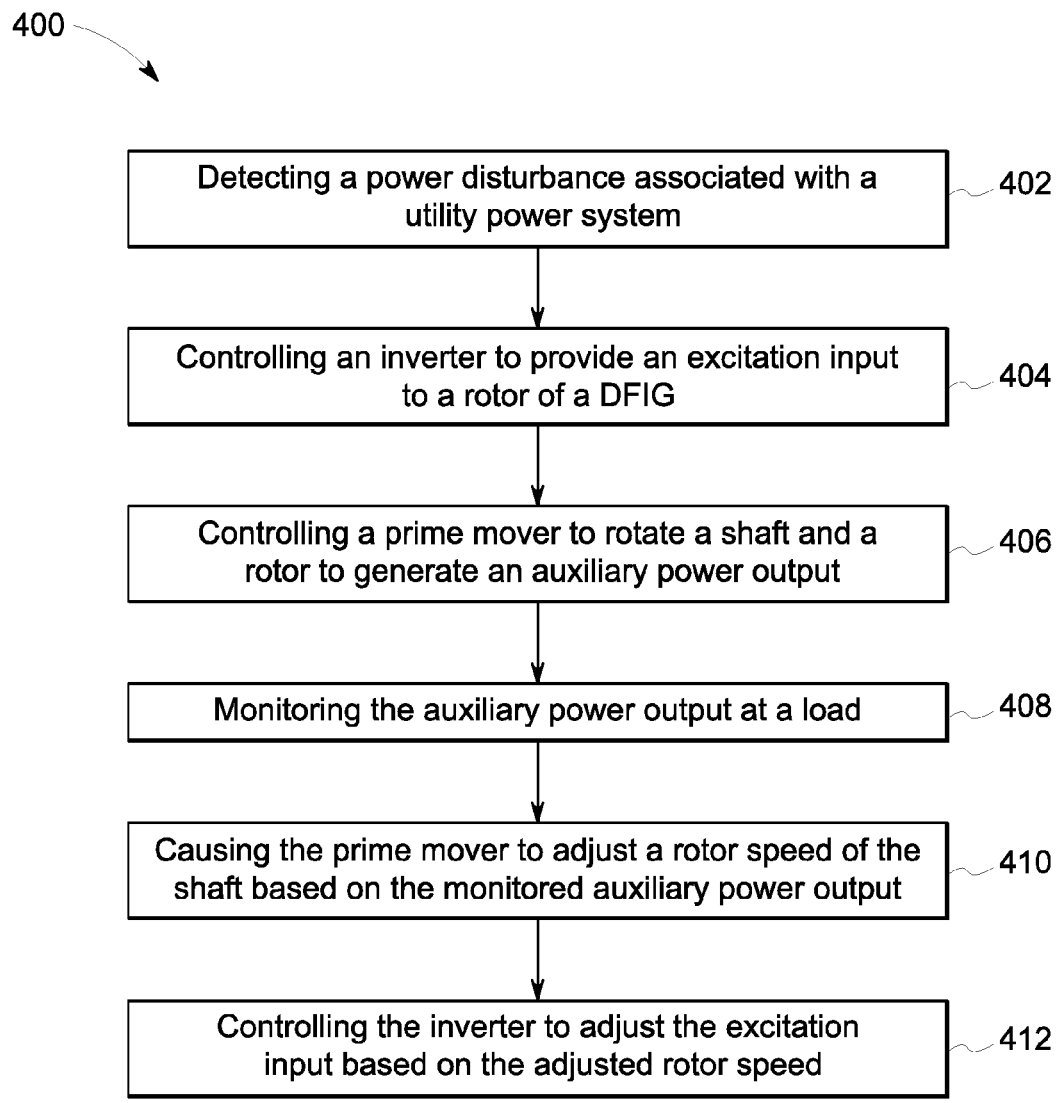
FIG. 4 is flow diagram of an exemplary method for controlling the UPS system shown in FIG. 1.

FIG. 4 is a flow chart of an exemplary process 400 of providing an auxiliary power output to load 10 using UPS system 100 (both shown in FIG. 1). In the exemplary embodiment, process 400 is performed by controller 110 (shown in FIG. 1).

Referring to FIGS. 1 and 4, controller 110 detects 402 a power disturbance associated with utility power system 20. In some embodiments, controller 110 is communicatively coupled to one or more computing devices or sensors within utility power system 20 to detect 402 the power disturbance. In other embodiments, controller 110 may monitor electrical data at load 10 to detect 402 the power disturbance. Controller 110 controls 404 inverter 104 to provide an excitation input to rotor 114 of DFIG 106 in response to the power disturbance. At least partially as a function of the excitation input, DFIG 106 generates an auxiliary power output through stator 112. The auxiliary power output is transferred to load 10 via stator bus 107.

Controller 110 controls 406 prime mover 108 to rotate shaft 116 and rotor 114 to generate the auxiliary power output. More specifically, controller 110 activates prime mover 108 and causes prime mover 108 to increase the rotor speed up to a predetermined rotor speed. Controller 110 monitors 408 the auxiliary power output at load 10 to determine whether or not to adjust the operation of inverter 104 and/or prime mover 108 to maintain a frequency and phase of the auxiliary power output similar to the power provided by utility power system 20. Controller 110 causes 410 prime mover 108 to adjust a rotor speed of shaft 116 based on the monitored auxiliary power output. Adjusting the rotor speed causes the frequency, phase, and/or magnitude of the auxiliary power output to be adjusted. Controller 110 controls 412 inverter 104 to adjust the excitation input based on the adjusted rotor speed to operate DFIG 106 in a synchronous, subsynchronous, or supersynchronous mode.

Controller 110 continues to monitor 408 the auxiliary power output and adjusts the rotor speed or the excitation input based on the monitored auxiliary power output. In some embodiments, controller 110 detects the power disturbance is resolved and deactivates prime mover 108 and inverter 104. In other embodiments, controller 110 may cause UPS system 100 to continue to supply the auxiliary power after the power disturbance is resolved. For example, controller 110 may monitor data associated with utility power system 20, such as power cost, power factor, voltage, and current, to determine whether or not to supply power to utility power system. In one embodiment, if controller 110 detects the power cost exceeds a threshold value, controller 110 may cause UPS 100 to provide power to utility power system 20.

The above-described systems and methods facilitate uninterrupted, controllable power at critical loads within a power system. Specifically, the above-described systems and methods facilitate providing auxiliary power to a load during periods that include a utility power supply experiencing a power disturbance, such as a blackout, brownout, or power of an insufficient quality. The above-described systems and methods include an uninterruptible power supply (UPS) system with a rechargeable energy storage system, a low voltage inverter, a doubly-fed induction generator (DFIG) coupled to the load, a prime mover, and a controller. The controller operates the inverter and the prime mover to control the UPS system. When the controller detects a power disturbance, the controller causes the inverter to generate an excitation input and provide the excitation input to a rotor of the DFIG. The rotor is attached to a rotatable shaft coupled to the prime mover. The controller activates the prime mover to cause the shaft and rotor to be rotated. Rotating the rotor and providing the excitation input causes the DFIG to generate an auxiliary power output at a stator of the DFIG. The auxiliary power output is transmitted to the load from the stator. The quality, frequency, phase, and magnitude of the auxiliary power output is controlled by adjusting the excitation input and a rotor speed of the prime mover to provide enhanced control over the UPS system.

The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

An exemplary technical effect of the methods, systems, and apparatus described herein includes at least one of: (a) adjusting an auxiliary power output by selectively adjusting rotor speed and an excitation input for enhanced control; (b) providing uninterruptible power to a load in the event of a power disturbance; and (c) transferring a portion of the auxiliary power to a utility power system to meet power demands of other loads.

Exemplary embodiments of method and systems for monitoring a dynamic system are described above in detail. The method and systems described herein are not limited to the specific embodiments described herein, but rather, components of systems or steps of the methods may be utilized independently and separately from other components or steps described herein. For example, the methods may also be used in combination with multiple UPS systems, and are not limited to practice with only UPS systems as described herein. Additionally, the methods may also be used with other components of devices, and are not limited to practice with only the components as described herein. Rather, the exemplary embodiments may be implemented and utilized in connection with many other devices that have components with operations lifetimes that need to be replaced over time.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An uninterruptable power supply (UPS) system for a load coupled to a utility power source, said UPS system comprising:
    a doubly-fed induction generator (DFIG) comprising a stator and a rotor coupled to the load, said stator and said rotor magnetically coupled together, wherein said DFIG is configured to generate an auxiliary power output;
    a rechargeable energy storage system;
    a first inverter coupled between said rotor and said rechargeable energy storage system; and
    a controller communicatively coupled to said DFIG and said first inverter, said controller configured to:
        control said first inverter to provide an excitation input to said rotor in response to a power disturbance associated with the utility power source, wherein said DFIG is further configured to provide the auxiliary power output to the load based on the excitation input.

2. The UPS system in accordance with claim 1 further comprising a prime mover coupled to said rotor, said prime mover communicatively coupled to said controller, wherein said controller is further configured to:
    cause said prime mover to rotate said rotor to generate the auxiliary power output;
    monitor the auxiliary power output at the load;
    cause said prime mover to adjust a speed of said rotor based on the auxiliary power output at the load, wherein adjusting the rotor speed causes the auxiliary power output to be adjusted; and
    control said first inverter to adjust the excitation input based on the adjusted rotor speed to operate said DFIG in one of a synchronous mode, a subsynchronous mode, and a supersynchronous mode.

3. The UPS system of claim 2, wherein said controller is further configured to:
    determine said DFIG is operating in one of the subsynchronous and supersynchronous modes; and
    control said first inverter to adjust a frequency of the excitation input based on the adjusted rotor speed, wherein the auxiliary power output has a frequency substantially equal to a frequency of a utility power output of the utility power source.

4. The UPS system of claim 2, wherein said prime mover is a diesel generator.

5. The UPS system of claim 2, wherein said controller is further configured to:
monitor data associated with the utility power source, the data including at least one of a power cost, a voltage, a current, and a power factor;
calculate a projected phase based on the monitored data and the auxiliary power output at the load; and
cause said prime mover to adjust the rotor speed of said rotor to adjust a phase of the auxiliary power output to the projected phase, wherein a portion of the auxiliary power output is transferred to the utility power source at the projected phase.

6. The UPS system of claim 4, wherein the controller is further configured to detect that the power cost associated with the utility power source exceeds a predetermined threshold cost.

7. The UPS system of claim 1, wherein said first inverter is further configured to:
extract alternating current (AC) real power from said DFIG when said DFIG is operating in a supersynchronous mode;
convert the real power into a direct current (DC) power; and
transmit the DC power to said rechargeable energy storage system for storage.

8. The UPS system of claim 2 further comprising a shaft coupled between said prime mover and said rotor, said prime mover configured to rotatingly drive said shaft to rotate said rotor.

9. The UPS system of claim 1 further comprising a second inverter coupled between said stator and said rechargeable energy storage system, said second inverter configured to charge the rechargeable energy storage system.

10. A controller for an uninterruptible power supply (UPS) system, the UPS system coupled to a load, said controller comprising:
a processor and a memory in communication with said processor, said controller communicatively coupled to a doubly-fed induction generator (DFIG), the DFIG including (i) a rotor and (ii) a stator coupled to the load, said controller further communicatively coupled to an inverter coupled between the rotor and a rechargeable energy storage system, the DFIG configured to generate an auxiliary power output, wherein said processor is configured to:
control the inverter to provide an excitation input to the rotor in response to a power disturbance associated with the utility power source, wherein the DFIG provides the auxiliary power output to the load based on the excitation input.

11. The controller of claim 10, wherein said controller is communicatively coupled to a prime mover coupled to the rotor, wherein said processor is further configured to:
cause the prime mover to rotate the rotor to generate the auxiliary power output;
monitor the auxiliary power output at the load;
cause the prime mover to adjust a speed of the rotor based on the auxiliary power output at the load, wherein adjusting the rotor speed causes the auxiliary power output to be adjusted; and
control the inverter to adjust the excitation input based on the adjusted rotor speed to operate the DFIG in one of a synchronous mode, a subsynchronous mode, and a supersynchronous mode.

12. The controller of claim 11, wherein said processor is further configured to:
monitor data associated with the utility power source, the data including at least one of a power cost, a voltage, a current, and a power factor;
calculate a projected phase based on the monitored data and the auxiliary power output at the load; and
cause the prime mover to adjust the rotor speed of the rotor to adjust a phase of the auxiliary power output to the projected phase, wherein a portion of the auxiliary power output is transferred to the utility power source at the projected phase.

13. The controller of claim 12, wherein said processor is further configured to detect that the power cost associated with the utility power source exceeds a predetermined threshold cost.

14. The controller of claim 10, wherein said processor is further configured to cause the inverter to extract alternating current (AC) real power from the DFIG when the DFIG is operating in a supersynchronous mode, wherein the inverter is configured to convert the real power into a direct current (DC) power and transmit the DC power to the rechargeable energy storage system for storage.

15. A method for coupling an uninterruptible power supply (UPS) system to a load coupled to a utility power source, the UPS system including a doubly-fed induction generator (DFIG), an inverter, a rechargeable energy storage system coupled to the inverter, and a controller communicatively coupled to the DFIG and the inverter, the DFIG including a stator coupled to the load and a rotor coupled to the inverter, said method comprising:
controlling the inverter to provide an excitation input to the rotor in response to a power disturbance associated with the utility power source, wherein the DFIG generates an auxiliary power output to the load based on the excitation input.

16. The method of claim 15 further comprising:
controlling, by the controller, a prime mover coupled to the rotor, the prime mover controlled to rotate the rotor to generate the auxiliary power output;
monitoring the auxiliary power output at the load,
causing, by the controller, the prime mover to adjust a speed of the rotor based on the monitored auxiliary power output, wherein adjusting the rotor speed causes the auxiliary power output to be adjusted; and
controlling the inverter to adjust the excitation input based on the adjusted rotor speed to operate the DFIG in one of a synchronous mode, a subsynchronous mode, and a supersynchronous mode.

17. The method of claim 16 further comprising:
determining, by the controller, that the DFIG is operating in one of the subsynchronous and supersynchronous modes;
controlling the inverter to adjust a frequency of the excitation input based on the rotor speed, wherein the auxiliary power output has a frequency substantially equal to a frequency of a power output of the utility power source.

18. The method of claim 16 further comprising:
monitoring, by the controller, data associated with the utility power source, the data including at least one of a power cost, a voltage, a current, and a power factor,
calculating a projected phase based on the monitored data and the auxiliary power output at the load; and
causing the prime mover to adjust the rotor speed of the rotor to adjust a phase of the auxiliary power output to the projected phase, wherein a portion of the auxiliary power output is transferred to the utility power source at the projected phase.

19. The method of claim 18, wherein monitoring data associated with the utility power source further comprises detecting that the power cost associated with the utility power source exceeds a predetermined threshold cost.

20. The method of claim 15 further comprising causing, by the controller, the inverter to extract alternating current (AC) real power from the DFIG when the DFIG is operating in a supersynchronous mode, wherein the inverter is configured to convert the real power into a direct current (DC) power and transmit the DC power to the rechargeable energy storage system for storage.

* * * * *